(12) United States Patent
Stoltz

(10) Patent No.: US 12,275,484 B2
(45) Date of Patent: Apr. 15, 2025

(54) IMPACT DAMPENING GRIPS

(71) Applicant: CIDUA (Pty) Ltd, Somerset West (SA)

(72) Inventor: Ivan Stoltz, Somerset West (ZA)

(73) Assignee: CIDUA (PTY) LTD, Somerset West (ZA)

( * ) Notice: Subject to any disclaimer, the term of this patent is extended or adjusted under 35 U.S.C. 154(b) by 0 days.

(21) Appl. No.: 18/244,246

(22) Filed: Sep. 9, 2023

(65) Prior Publication Data
US 2024/0083541 A1    Mar. 14, 2024

(30) Foreign Application Priority Data
Sep. 13, 2022    (GB) ...................... 2213330

(51) Int. Cl.
B62K 21/26    (2006.01)
B25G 1/01    (2006.01)
B25G 1/10    (2006.01)

(52) U.S. Cl.
CPC ............. B62K 21/26 (2013.01); B25G 1/01 (2013.01); B25G 1/102 (2013.01)

(58) Field of Classification Search
CPC . B62K 21/26; B25G 1/01; B25G 1/02; B25G 1/102; A63B 60/54; B25D 17/043
See application file for complete search history.

(56) References Cited

U.S. PATENT DOCUMENTS

| 421,277 | A |  | 2/1890 | Horton et al. |
| 880,297 | A | * | 2/1908 | Graham ................. B62K 21/14 |
|  |  |  |  | 74/551.9 |
| 2,439,636 | A | * | 4/1948 | Saracchi ................. B62K 21/26 |
|  |  |  |  | 74/551.9 |

(Continued)

FOREIGN PATENT DOCUMENTS

| BE |   443664 A | 1/1942 |
| CN | 211468676 U | 9/2020 |

(Continued)

OTHER PUBLICATIONS

UK Non-Provisional Patent Application No. GB 2213330.0 filed Sep. 13, 2022, in the name of Ivan, Stoltz, Cidua (Pty) Ltd.

(Continued)

*Primary Examiner* — Thomas C Diaz
(74) *Attorney, Agent, or Firm* — Franklin & Associates International Inc; Matthew Lambrinos

(57) ABSTRACT

A shock dampening grip includes a sleeve to be gripped by a person's hand, in use, which sleeve is of a resiliently deformable material, and which defines a bore for receiving a handlebar therethrough, in use, which bore is oblong shaped in cross section to allow generally linear transverse movement of the handlebar within the bore, the sleeve further including a dampening mechanism located in the operatively upper part of the bore. The grip further includes a pair of end caps configured to fit over and fasten onto a handlebar to define a pair of opposed flanges in use to capture the sleeve between them, and complementary guide formations respectively on the opposed faces of the flanges of the end caps and the edges of the sleeve to guide the movement of the sleeve along the generally linear path transverse to the handlebar, in use.

13 Claims, 14 Drawing Sheets

(56) References Cited

U.S. PATENT DOCUMENTS

| | | | | |
|---|---|---|---|---|
| 3,322,211 | A * | 5/1967 | Alabuzhev | B25D 17/043 |
| | | | | 267/170 |
| 5,522,466 | A * | 6/1996 | Harada | B25D 17/043 |
| | | | | 173/162.2 |
| 8,484,806 | B2 | 7/2013 | Rarick | |
| 9,580,133 | B2 | 2/2017 | Aymar | |
| 11,440,610 | B2 * | 9/2022 | Song | B62K 23/04 |
| 2015/0225037 | A1 | 8/2015 | Mildenberger | |
| 2016/0101824 | A1 * | 4/2016 | Aymar | A63B 60/14 |
| | | | | 16/436 |
| 2022/0204119 | A1 | 6/2022 | Song et al. | |

FOREIGN PATENT DOCUMENTS

| | | |
|---|---|---|
| CN | 213862548 U | 8/2021 |
| DE | 202010011987 U1 | 12/2011 |
| GB | 602359 A | 5/1948 |
| GB | 2095362 A | 9/1982 |
| KR | 20130028029 A | 3/2013 |

OTHER PUBLICATIONS

UK Search Report on International Patent Application No. GB 2213330.0 filed Sep. 13, 2022, in the name of Ivan Stoltz, Cidua (Pty) Ltd.
European Search Report issued Jan. 10, 2024, on a EP Application No. EP 23 195 253, filed Sep. 4, 2023, in the name of Cidua Pty Ltd.
European Opinion issued Jan. 10, 2024, on a EP Application No. EP 23 195 253, filed Sep. 4, 2023, in the name of Cidua Pty Ltd.
Information on Search Strategy on a EP Application No. EP 23 195 253, filed Sep. 4, 2023, in the name of Cidua Pty Ltd.
Communication the extened European Search Report issued Jan. 18, 2024, on a EP Application No. EP 23 195 253, filed Sep. 4, 2023, in the name of Cidua Pty Ltd.

\* cited by examiner

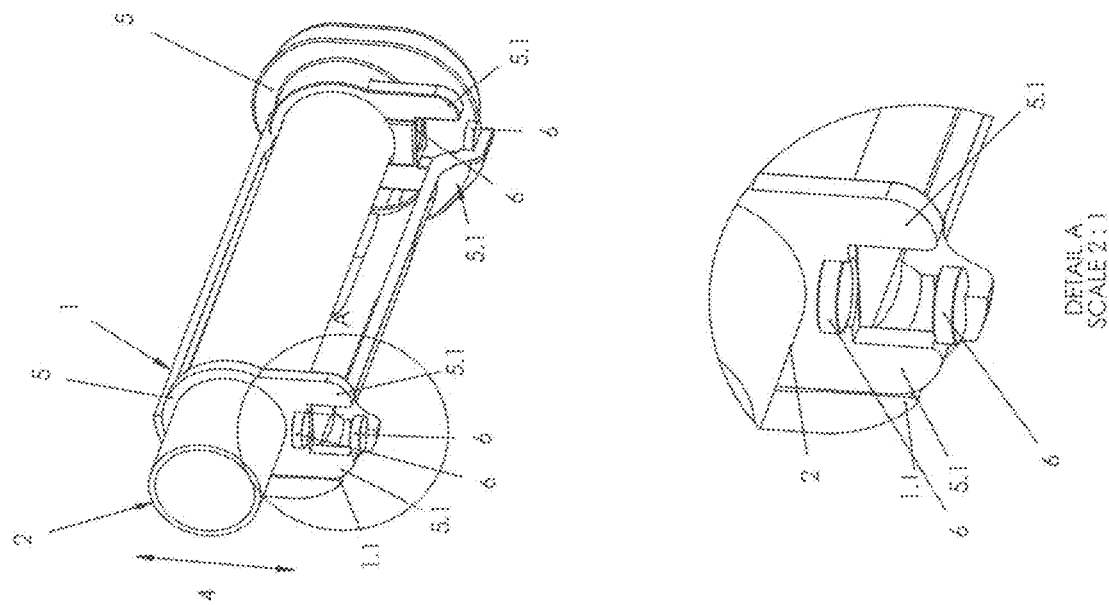
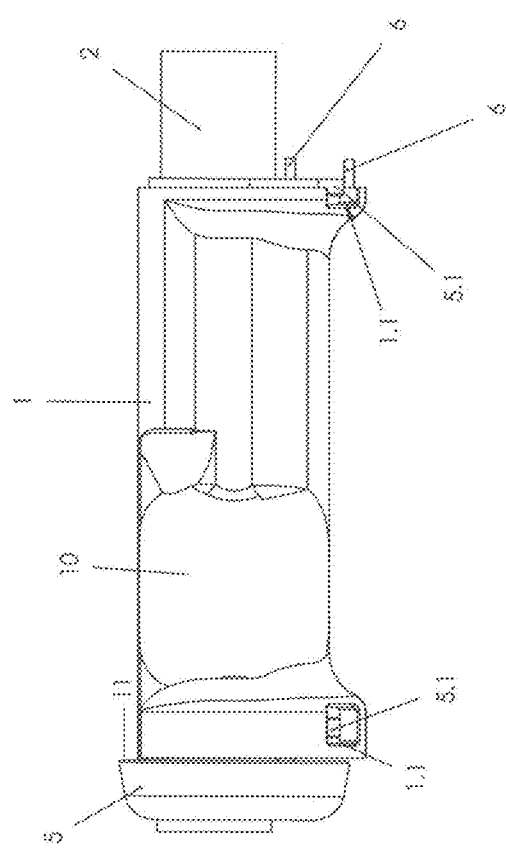
Figure 7A

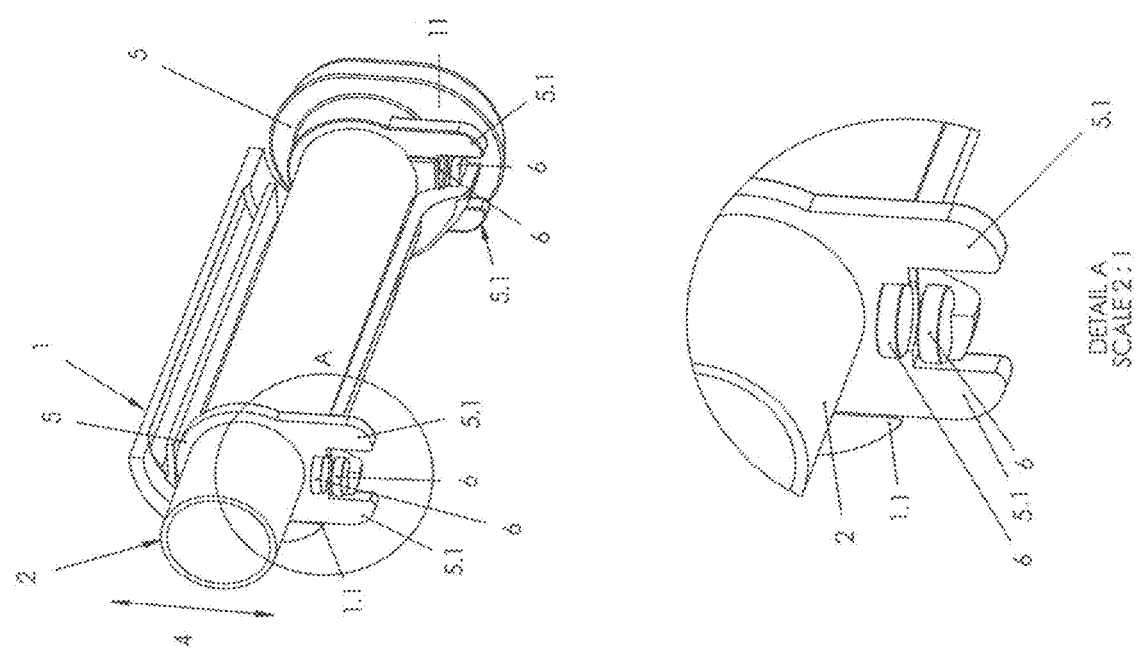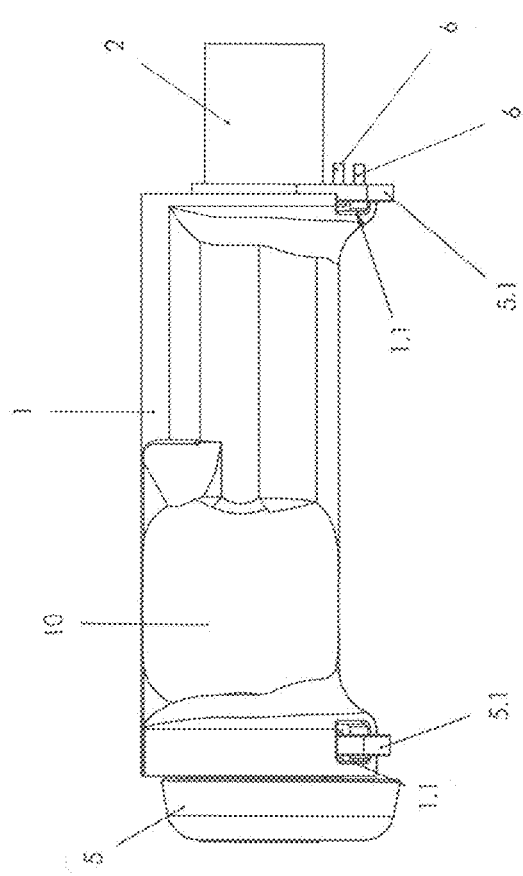
Figure 7C

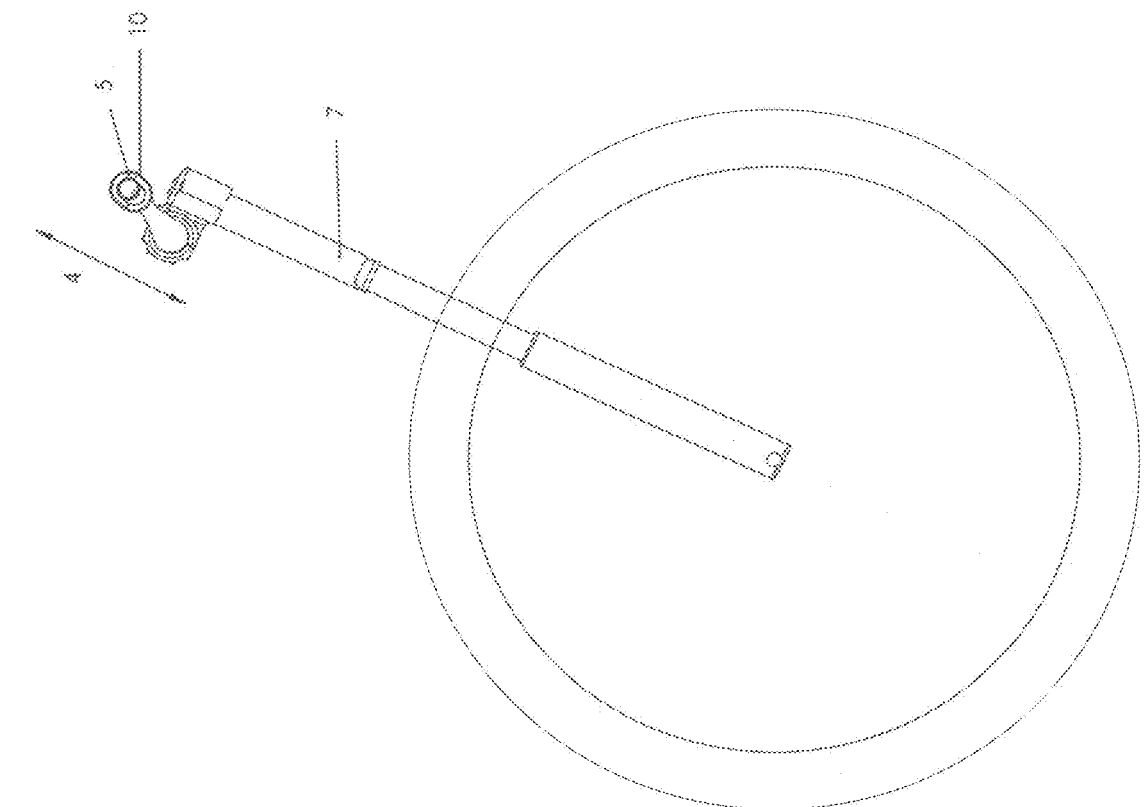
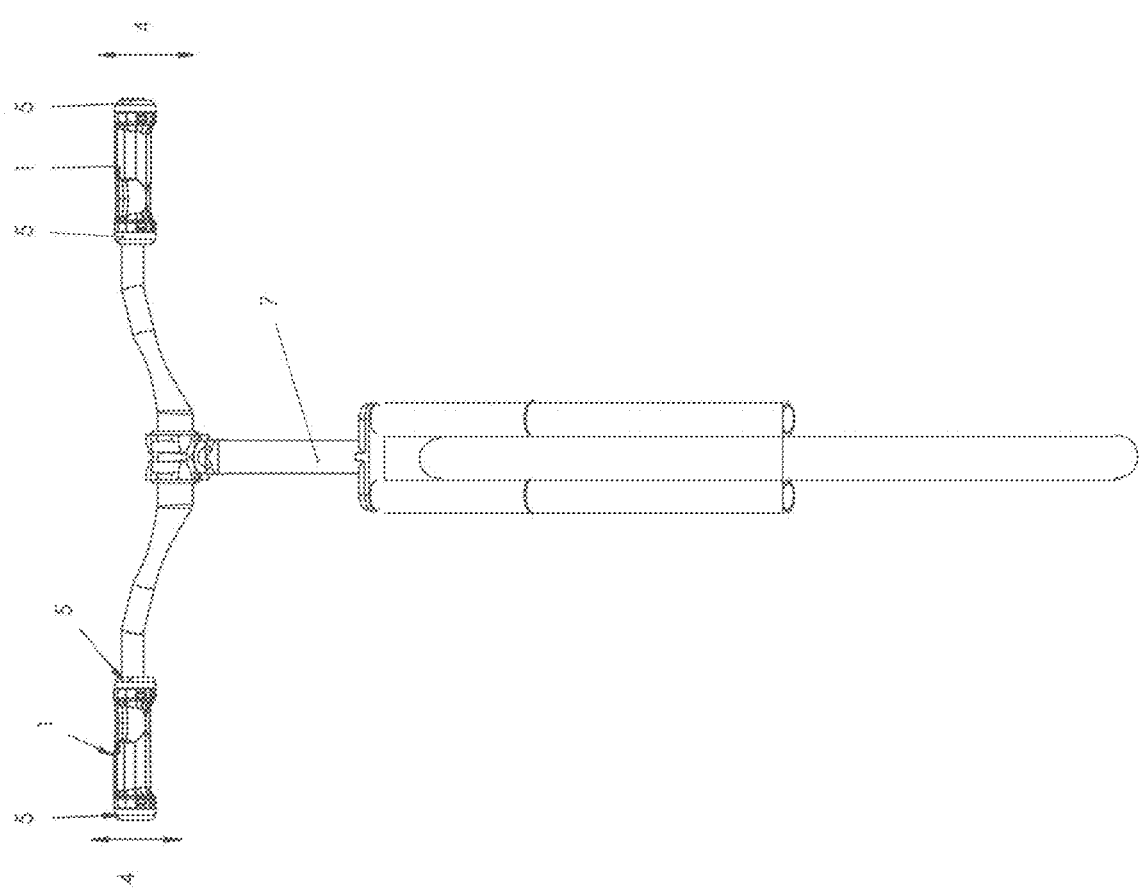
Figure 8A

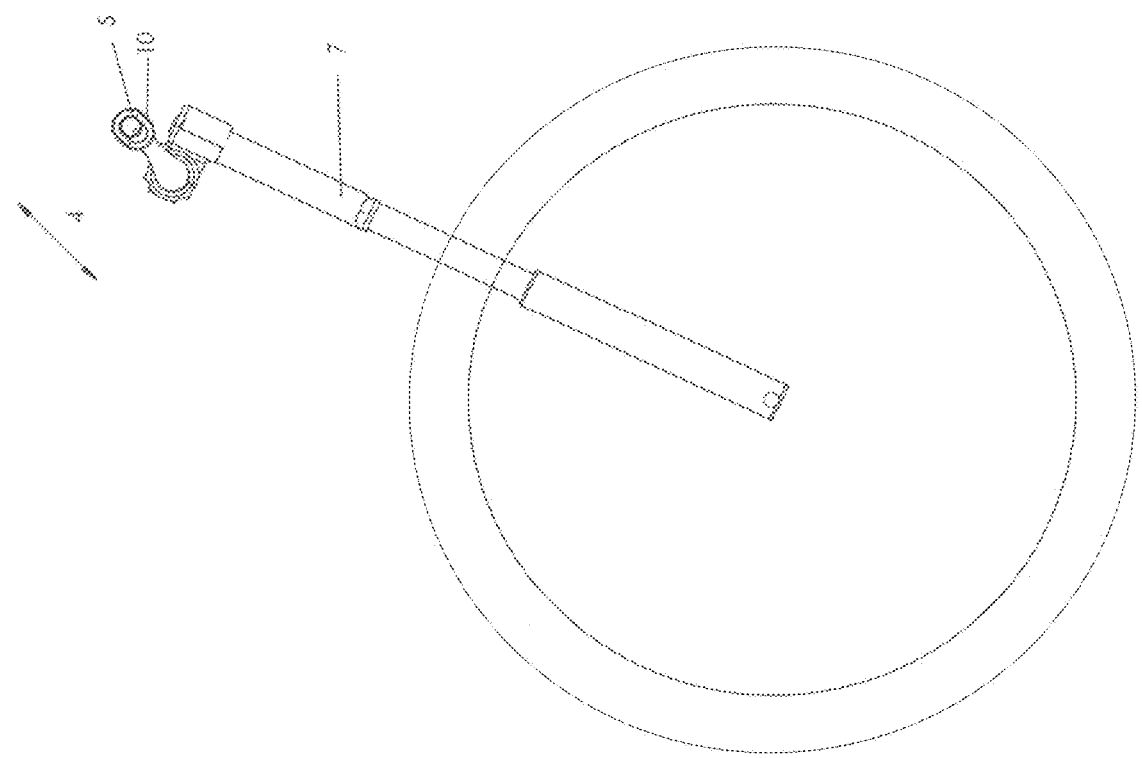
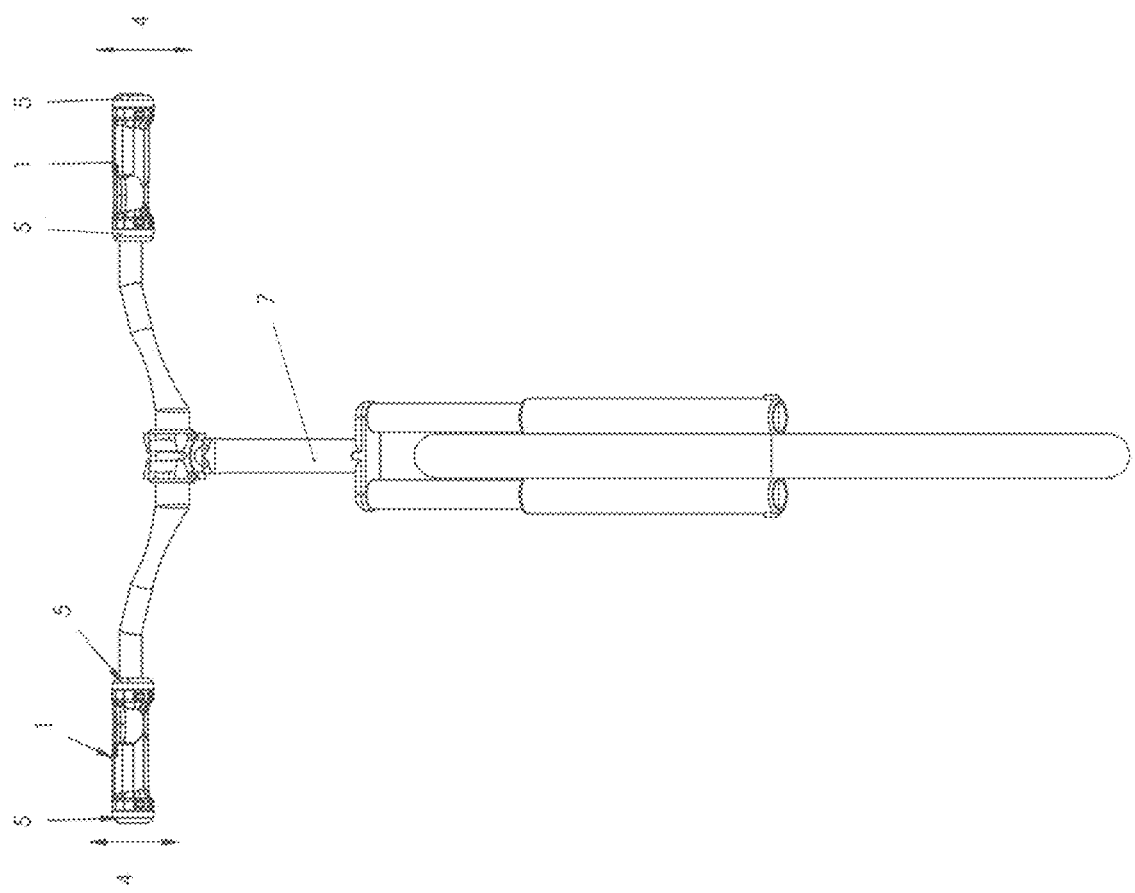
Figure 88

IMPACT DAMPENING GRIPS

CROSS REFERENCE TO RELATED APPLICATIONS

The present application claims priority to United Kingdom Patent Application No. GB 2213330.0, filed on Sep. 13, 2022 and entitled "Impact dampening Grips", the entire contents of which are incorporated herein by reference.

TECHNICAL FIELD OF THE INVENTION

This invention relates to new impact dampening or impact attenuating grips for bicycles or motor vehicles steered with handlebars and reciprocating or vibrating machinery.

BACKGROUND TO THE INVENTION

Modern bicycles, especially mountain bikes, have evolved over the years to offer improved comfort, safety and handling by introducing suspension systems, larger tubeless tyres, disk brakes etc. Despite these improvements the contact point between hands and handlebar still encounters significant impact forces especially in rougher terrain. Since the nature of the bicycle suspension is to absorb larger undulations and bumps in a controlled manner considering total rider and bike mass it is less effective with smaller bumps, vibrations and undulations also referred to as small bump absorption. Should the suspension be softened to provide a more comfortable ride for small bump absorption it will reach its maximum travel distance prematurely i.e., "bottom out" with larger undulations and bumps and therefore requiring a compromise. Some riders will compromise control and efficiency for comfort by reducing the air pressure in tyres and soften suspension to create a more comfortable ride, however this compromise has its own drawbacks such as vague steering, sudden loss of pressure resulting in dangerous loss of control.

The inventor is aware that mountain bike and motorbike riders often suffer from hand and forearm fatigue, "arm pump", when riding over rough terrain.

Skilled and experienced riders mitigate this by applying a "loose grip" as far as the terrain and circumstances allow. However, if the terrain becomes excessively rough using a loose grip may not be possible and using a loose grip is normally not part of inexperienced rider's skill sets.

Evolvement in the technology and design of bicycle grips are evident as hand and arm fatigue had always been a reality in mountain bike riding, over the years several versions of handlebar grips have been offered claiming more comfort and better control. Usually, these grips have a higher comfort level and will compromise on control and vice versa, some utilize softer material compounds while others offer a palm rest visually similar to a "wing" or "flared" area as for example disclosed in patent DE 202010011987 thereby distributing impact forces over a wider surface of the hand which in turn creates a more comfortable riding experience. While these "flared" grips are generally comfortable on smoother roads they tend to be a compromise in rough terrain since the palm rest simulates a ramp type effect where many riders feel the tendency is for the hands to push over the handlebar instead of against it.

Other types of grips offer a rotational dampening effect such as described in U.S. Pat. Nos. 8,484,806, 9,580,133 and application No. US20150225037 disclosing torsional damping to assist comfort and control. However these grips utilize thermoplastic or rubber type materials to dampen the torsional rigidity but has minimal damping transverse to the impact forces. Common to these grips are that a sleeve or grip in contact with hands is connected by some means to an elastomer or rubber like damper to in turn allow a rotational movement of which degree of rotation is limited by the damper. However, most of the shock and impacts which is transferred to a bike rider or user of vibrating machinery is generally linear and transverse to the grips.

Several riders find the rotating grips overcomplicated and expensive with minimal benefit therefore generally the preferred grip for control in difficult and more extreme situations is still the common normal round grip with a flexible type of covering for optimal grip and to a lesser extent shock absorbance. In essence there are grips that will provide slightly better comfort or control in specific situations but there is always a compromise.

A clear distinction should also be made between experienced and inexperienced riders, while experienced riders are trained to involve core body muscles in technical riding while at the same time staying relaxed in their upper bodies, inexperienced riders are not utilizing the core muscles as they should and tend to place more bodyweight directly on the handlebar as well as having a tighter grip thereby placing significantly more tension on hands and arms. Generally In terms of compromise the tendency for experienced riders would be to opt for safety and control vs comfort for casual or inexperienced riders.

Therefore, there is a need to provide a grip assembly constructed to overcome the shortcomings of the grip assemblies known in the prior art.

It is an object of the invention to provide cost effective grips which absorbs or dampens, at least some, of the transverse linear shocks and which simulates a loose grip to mitigate arm pump, improves bike control and riding experience, and suitable for use by both experienced and non-experienced riders.

GENERAL DESCRIPTION OF THE INVENTION

According to the invention there is provided a shock dampening grip, which grip includes:
- a sleeve to be gripped by a person's hand, in use, which sleeve is of a resiliently deformable material, and which defines a bore for receiving a handlebar therethrough, in use, which bore is oblong shaped in cross section to allow generally linear transverse movement of the handlebar within the bore, the sleeve further including a dampening mechanism located in the operatively upper part of the bore;
- a pair of end caps configured to fit over and fasten onto a handlebar to define a pair of opposed flanges in use to capture the sleeve between them; and
- complementary guide formations respectively on the opposed faces of the flanges of the end caps and the edges of the sleeve to guide the movement of the sleeve along the generally linear path transverse to the handlebar, in use.

The dampening mechanism may be in the form of a septum spanning across the operatively upper part of the bore to define a chamber above the bore. It is to be appreciated that the dampening mechanism may take a number of forms and may include any resiliently deformable formation, insert or the like.

The endcaps and/or sleeves may further be provided with a neutral position return mechanism to locate the sleeve with its dampening mechanism against the handlebar, ready to absorb a shock, in use. The neutral position return mechanism may include springs or preferably repulsing magnets.

It is to be appreciated that the handlebar is moveable inside the oblong shaped bore and that the neutral position return mechanism serves to prevent unnecessary play or movement of the sleeve during use and will dampen or modulate the return movement of the handlebar after an upward shock has been absorbed. In addition, should the rider experience a pull force on the handlebar such as riding through a hole, the movement down the bore will be dampened by the neutral position return mechanism. In other words, it serves as a locating means and a return and downward stroke dampening means. The inventor has found that this feature improves the rider or user experience as it provides contact between the grip and handlebars and removes rattle while simulating a loose grip used by skilled and experienced riders.

The complementary guide formations may be in the form of pins or ridges orientated along the intended linear transverse movement of the sleeve and formed on the inside face of the endcaps and complementary holes or channels formed proximate the ends of the sleeve for receiving the pins or ridges, respectively, therein to guide the sleeve relative to the end caps, in use. It is to be appreciated that the end caps function to capture the sleeve between them and to guide the sleeve along a linear path and to limit rotational movement of the sleeve. It is to be appreciated that the linearly allowed transverse movement of the handlebars in the sleeve will, in use, accommodate upward and downward forces for bumps and holes, respectively, but prevent excessive rotational movement and the sideways movement of the handlebar inside the sleeve due to wheel direction change forces and therefor not compromise on steering control, unlike prior art grips which allow "free floating" movement of the handlebars and all directions inside a sleeve.

The material for the sleeve may preferably be rubber material and it is to be understood that rubber material includes natural and synthetic resiliently deformable rubbers such as Silicone. The rubber material may be any mouldable or extrudable rubber material. In some embodiments, the material for the sleeve may comprise Thermoplastic Polyurethane (TPU).

The endcaps may be configured to clamp onto the handlebars, in use.

The direction or angle of the linear motion can be adjusted by orientating the complementary guide formations at a preferred angle on handlebar and then fastening the end caps on the handlebar. A cyclist can orientate the grip according to the most prevalent position required by the terrain or type of riding. For example, if the rider intends to sit most of the time such as on a generally flat road the angle may be flat and if the rider intends to descend a technical downhill mostly standing on the peddles, the angle may be more downward.

The range of allowed linear motion between the sleeve and handlebar has the benefit that the bicycle is allowed a significant degree of free motion transverse to handlebar without relaying impact directly to rider irrespective of whether the rider has a relaxed or tight grip on the sleeve of the grip assembly. This range of motion within the sleeve has several benefits for the rider. Firstly, a significant improvement of comfort and control over small bumps such as corrugated roads, gravel, pebble roads etc. as the shock, impact and vibration between hands and handlebar in many cases can be eliminated almost in its entirety especially when the rider utilize their body core muscles to allow the bicycle to move freely within the range of motion provided, which simulates a "lose grip". This benefit increases in rough downhill sections where riders normally stand on the pedals naturally involving body core muscles thereby allowing the bicycle more freedom of movement within the grip assembly. Also in uphill sections there is a significant gain in comfort and control as the rider typically pulls more frequently on the handlebar in which case bumps and undulations will be compensated for and absorbed due to the grip allowing a bi-directional range of free motion, or pull forces, depending on the rider body position. For example, should a rider be climbing a gradient with hands pulling on the grips the tubular section will be in position where the bottom portion of the bore is in contact with bottom portion of handlebar while the septum will be at upper section between handlebar and bore, should an obstacle such as a rock or tree root be encountered while rider is pulling on grips the bicycle will be allowed to move within the grip assembly to take up all available travel within the sleeve till reaching the maximum travel distance against dividing membrane before transferring impact to rider. This range of active damping travel within the bore is preferably in the 8-10 mm range. Once the limit of free travel within the bore is used and the septum is contacted, the damping mechanism will further soften direct impact to rider to provide a balance of small and large bump absorption for the rider.

Generally, by eliminating small bumps and reducing large obstacle impact without interfering with steering precision, the rider will have more control and feel less fatigued over the duration of a ride.

A further benefit of the grip is that the riders balance is less affected as is the norm due to body movement not being transmitted to bicycle handlebars directly, for example when standing up accelerating hard, usually left and right arms pull out of sequence with each other exerting a significant sideways sway effect to bicycle, transferring of this uneven sequence to bicycle is reduced as a result of the free motion provided within grip being linear only.

A further significant benefit occurs when applying brakes in rough downhill sections, with normal grips due to some fingers now being on brake lever hand grip is significantly reduced. Due to the free-floating motion within grip assembly the direct impact on hands is reduced in such instance to provide greatly enhanced control while pulling brake levers.

Additionally, elbow injuries such as tennis elbow can be avoided and riders with minor wrist injuries reported a radical improvement insofar as comfort and control making it possible to ride terrain they otherwise would have avoided.

Further benefits are that as a training tool for new or casual riders the grip assembly will reward the rider should he or she utilize core muscles to utilize the full linear travel available instead of primarily the static damping portion. For example, wherever a rider can utilize the core muscles by keeping the handlebar in a neutral position in the sleeve in a position of equilibrium the impact of small bumps can be eliminated almost in its entirety as the bicycle will move freely within grip assembly without reaching the limits available within the plenum zone.

DETAILED DESCRIPTION OF THE INVENTION

The invention is now described by way of example with reference to the accompanying drawings.

Figure 1:
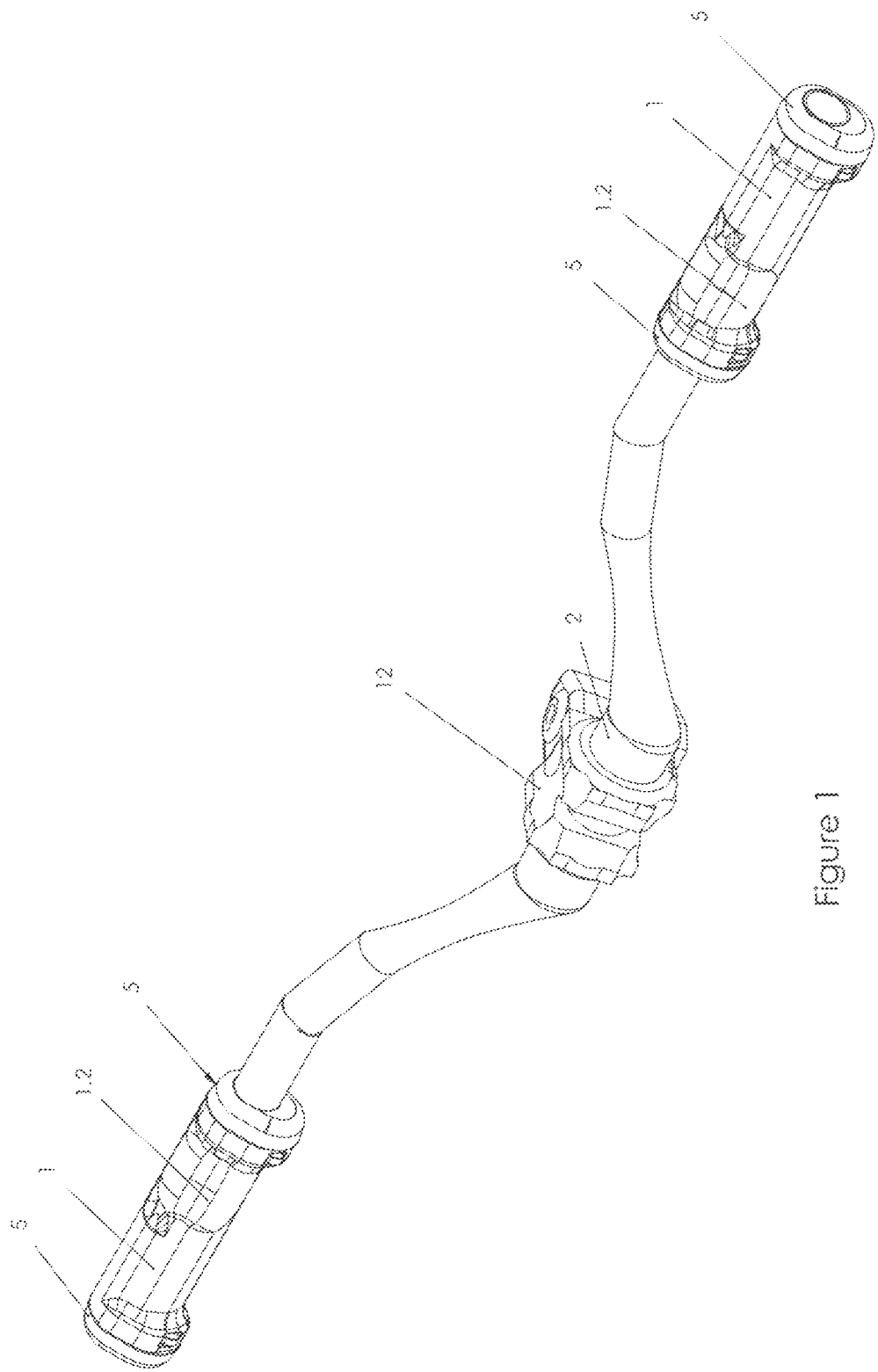
FIG. 1 shows a top perspective view of a pair of grips fitted to a handlebar according to the invention.
Figure 2:
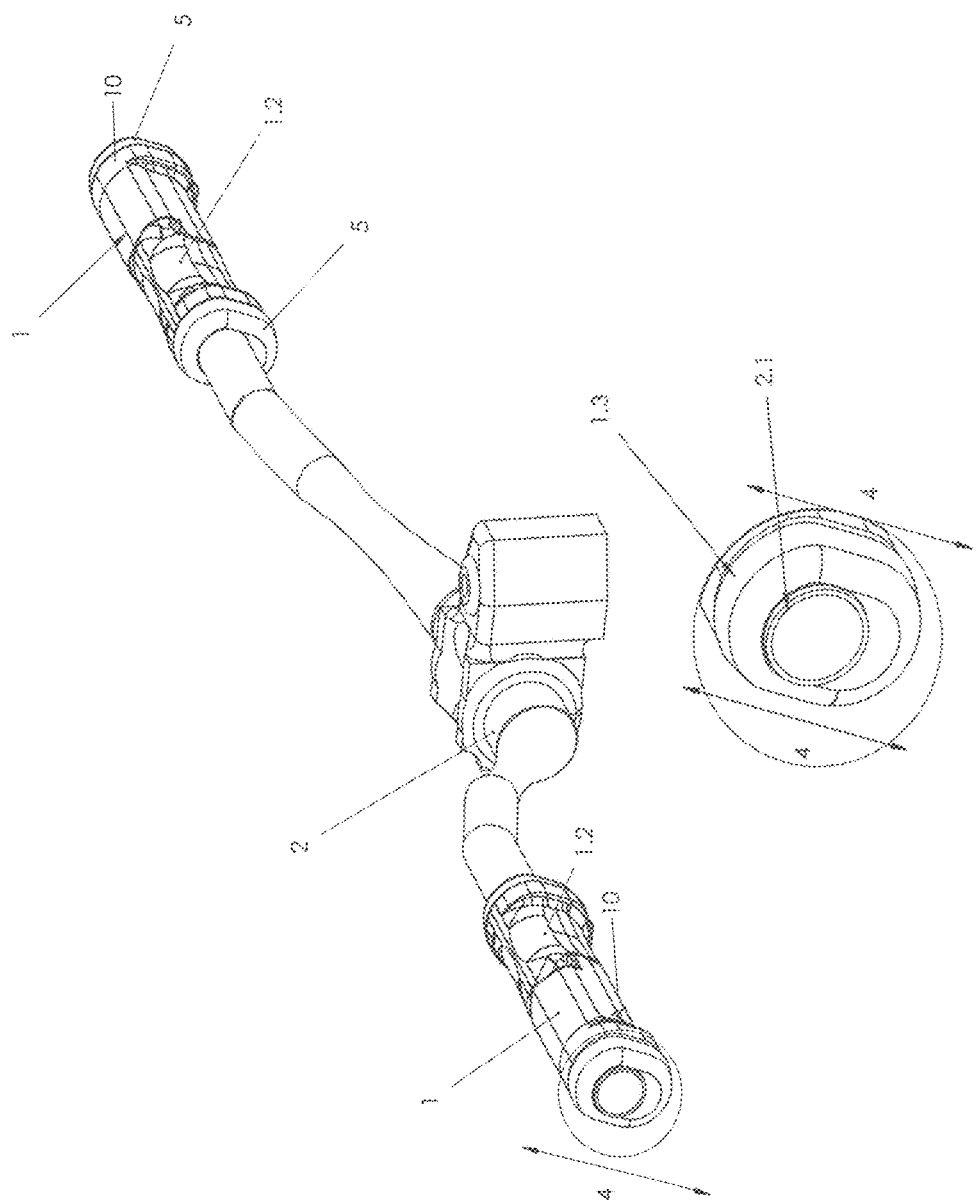
FIG. 2 shows a side perspective view with details of the grip.
Figure 3:
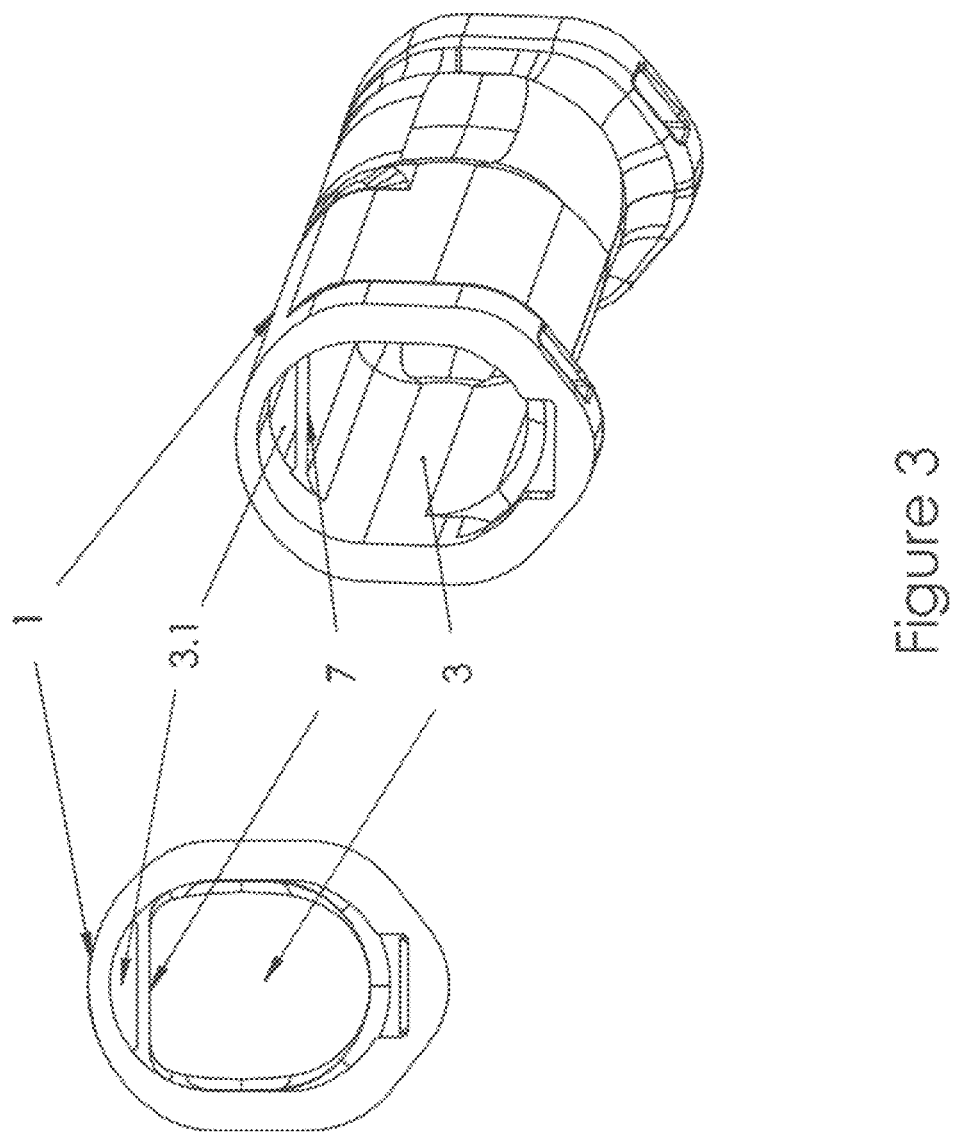
Figure 4:
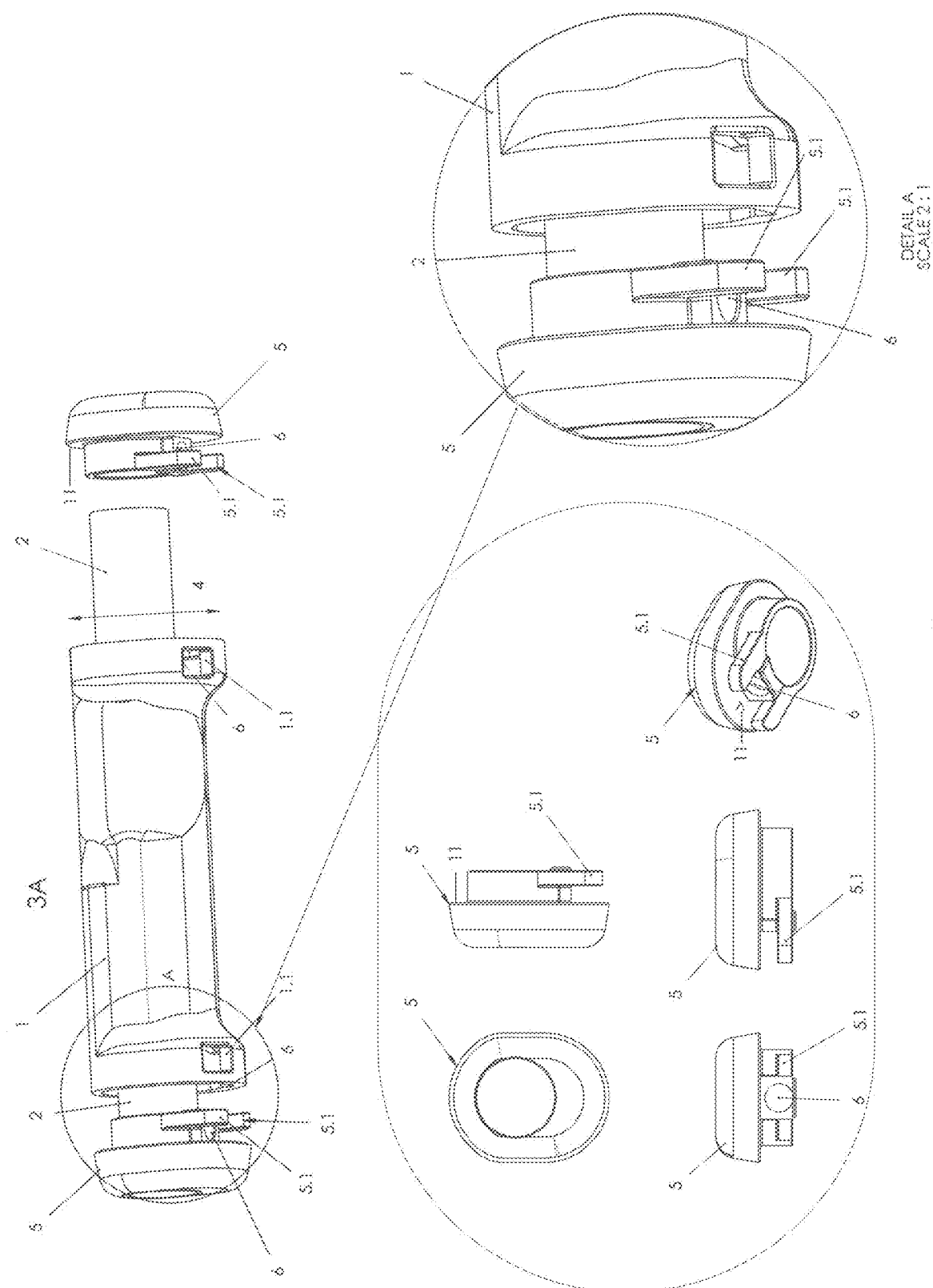
Figure 5:
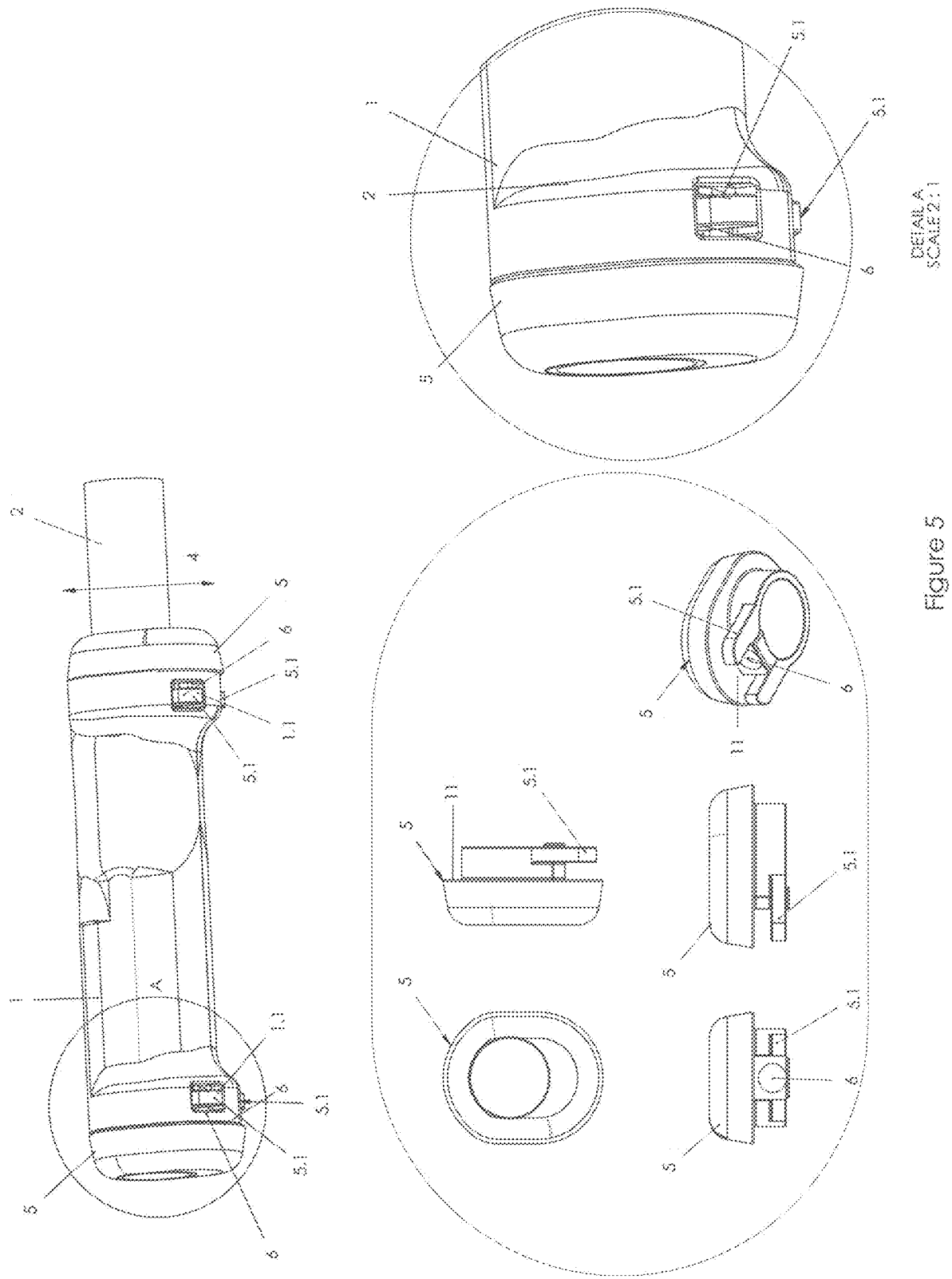
Figure 6A:
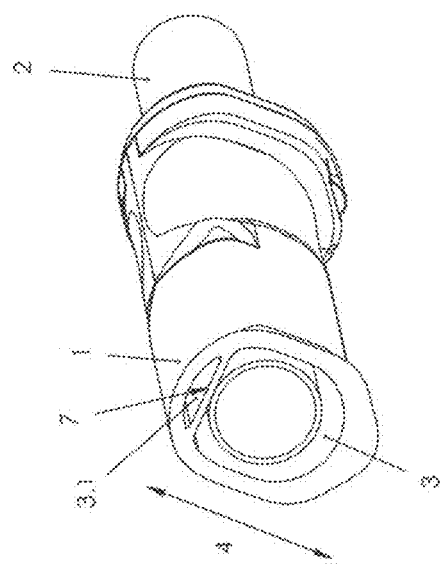
Figure 6B:
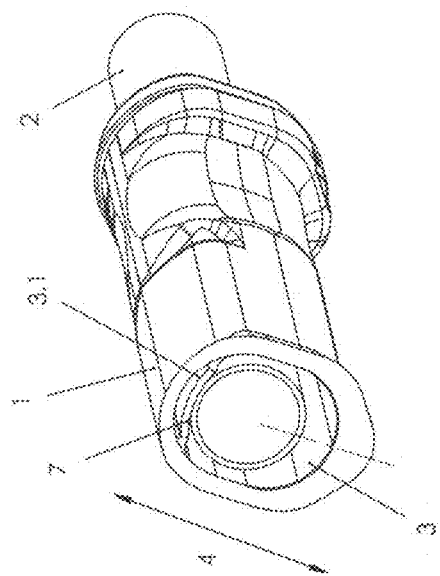
Figure 6C:
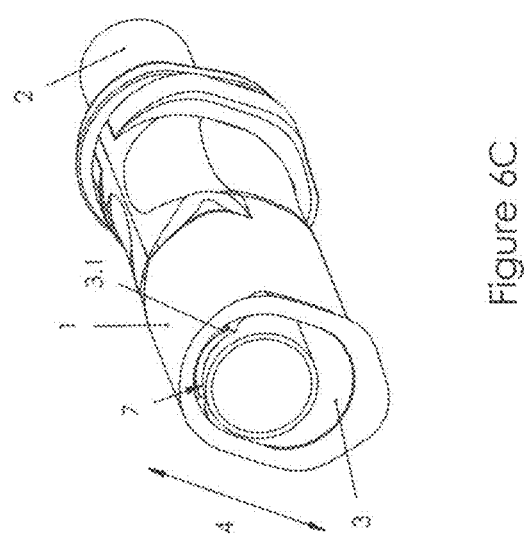
Figure 6D:
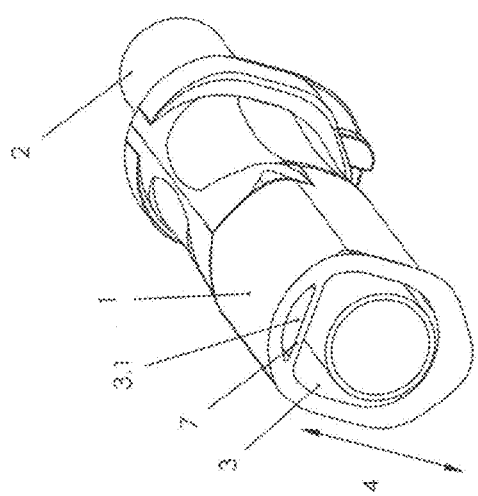

FIG. 3 shows a side perspective view with a sectional view of the grip; FIGS. 4 and 5 shows exploded, detailed and projected views of the grip; FIG. 6A shows a sectional view of the sleeve with the grip in a neutral located position;

FIG. 6B shows a sectional view of the sleeve with the grip in a partially upward force or shock dampening position;

FIG. 6C shows a sectional view of the sleeve with the grip in an end of stroke upward force or shock dampening position;

FIG. 6D shows a sectional view of the sleeve with the grip in an end of stroke downward force or shock dampening position;

FIG. 7A to &C shows partially sectioned and detailed side views and end perspective views of the grip in a various stages of downward force or shock dampening; and FIGS. 8A and 8B shows a front and side of the grip fitted on a bicycle depicting angle of adjustment.

Referring now to the drawings, a shock dampening grip is generally indicated by reference numeral 10. The grip 10 includes a sleeve 1 to be gripped by a person's hand, in use, which sleeve is of a resiliently deformable rubber material and the grip defines a bore 3 for receiving a handlebar 2 therethrough. The bore 3 is oblong shaped in cross section and with a width larger than the diameter of the handlebar 2 to allow generally linear transverse movement of the handlebar within the bore.

The sleeve 1 further includes a dampening mechanism in the form of a resiliently deformable septum 7 located in the operatively upper part of the bore 3. The dampening mechanism in the form of the septum 7 which spans across the operatively upper part of the bore 3 define a chamber 3.1 above the bore.

The grip 10 further includes a pair of end caps 5 configured to fit over and clamp onto a handlebar 2 to define a pair of opposed flanges 11 in use to capture the sleeve 1 between them.

Complementary guide formations 5.1 and 1.1 respectively on the opposed faces of the flanges 11 of the end caps 5 and the edges of the sleeve 1 to guide the movement of the sleeve 1 along the generally linear path transverse to the handlebar 2, in use. The complementary guide formations 1.1 and 5.1 are in the form of pins 5.1 on the inside face of the endcaps 5 orientated along the intended linear transverse movement of the sleeve 1. Complementary holes 1.1 are formed proximate the ends of the sleeve 1 for receiving the pins 5.1, respectively, therein to guide the sleeve 1 relative to the end caps 5, in use. The guide formation 1.1 and 5.1 prevent rotational movement of the sleeve 1 around handlebar 2 as well as keeping the sleeve 1 secured to the handlebar.

The endcaps 5 and sleeves 1 are further provided with a neutral position return mechanism in the form of oppositely arranged repulsing magnets 6 to locate the sleeve 1 with its shock absorber against the handlebar, ready to absorb a shock, in use. One magnet is fixed in a pocket inside the sleeve 1 at the bottom of each end of the sleeve 1 facing up and each complementary magnet 6 is fixed in a pocket at the bottom of each end cap 5 facing up.

As shown in FIGS. 8A and 8B, a cyclist can orientate the grip 10 according to the most prevalent position required by the terrain or type of riding. The outer shape of the sleeve defines the shape complementary to a cyclist hand and a thumb indexing indent 1.2 is provided where the thumb normally grips round handlebar, this allow placement of thumb in a more natural position for increased comfort and reduced hand fatigue.

FIG. 6A is a sectional drawing that shows the position at rest when septum 7 will be in contact with the handlebar 2. Normally when riding on flat even terrain the septum 7 will be slightly compressed as depicted in FIG. 6B.

Should a rider encounter obstacles while riding, the sleeve 1 will allow movement of the handlebar 2 in a linear fashion within the bore 3 as indicated by arrows 4. The range of primary movement to vary between a maximum compressed position shown in FIG. 6C and a maximum expanded position shown in FIG. 6D. It is important to note the available range of motion within the bore 3 is to allow the bicycle handlebar to move freely within the grip assembly while the rider stays in a more stationary or less affected riding position.

When encountering small bumps within the available range in the bore 3, the rider will by incorporating the correct riding position encounter practically no discernible impact to his hands and arms since bicycle handlebar movement will occur within the bore 3 in a range as depicted in FIGS. 6A and 6D. As soon as available range of motion within the bore 3 is taken up against septum 7 the rider will experience a reduced impact since septum 7 will act as a secondary damping system by compressing septum 7 in a range as shown between 6B and 6C in FIG. 6 thereby providing an air cushioning type damping effect.

Encountering large obstacles will therefore encounter a reduction of direct impact due to active damping portion within bore 3 before reaching the secondary damping system provided by plenum 7 in conjunction with chamber 3.1

Figure 7B:
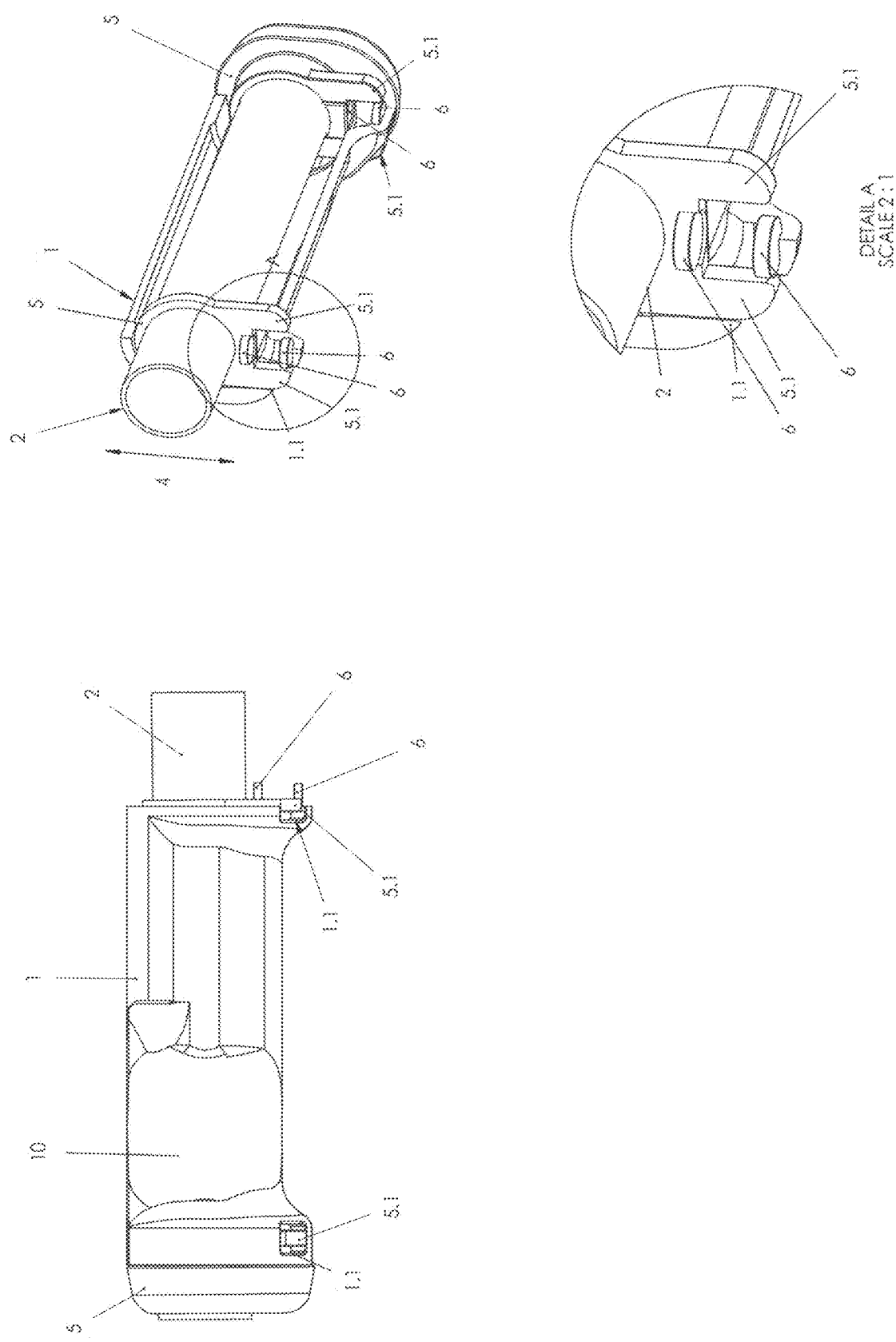

In FIGS. 7a to 7C the guide's 1.1 and 5.1 linear movement guiding and anti-rotation function is shown in various stages within the grip 10 assembly. For illustrative purposes both left and right hand grips are shown with the left hand grip 10 view sectioned to show the function of guide 5.1 in motion throughout range in direction of arrows 4. Also for illustrative purposes the left and right hand grips are shown to move in sync with each other but in reality they will each function individually. FIG. 7A depicts the grip 10 in a maximum compressed state utilizing both active and passive stages of the damping systems. FIG. 7B displays the intermediate position and FIG. 7C displays the maximum extended position. In FIG. 7 it can be seen that extension 5.1 will protrude through cavity 1.1 in the sleeve 1 throughout the range of motion thereby allowing a sliding function of the sleeve 1 in direction of arrows 4 over handlebar 2 but simultaneously prevent rotation of the sleeve 1 over handlebar 2.

In the preferred embodiment of the grip, it will be moulded from a resiliently deformable material such as polyurethane or other durable elastomer material. Although the preferred device is described herein it should be noted that several versions and variants can be construed based on the same principle of allowing a freely moveable portion of the grip assembly to slide in a linear fashion perpendicular to a round handlebar.

It shall be understood that the examples are provided for illustrating the invention further and to assist a person skilled in the art with understanding the invention and are not meant to be construed as unduly limiting the reasonable scope of the invention.

The invention claimed is:

1. A shock dampening grip, which grip includes:
a sleeve to be gripped by a person's hand, in use, which sleeve is of a resiliently deformable material, and which defines a bore for receiving a handlebar therethrough, in use, which bore is oblong shaped in cross section to allow generally linear transverse movement of the handlebar within the bore, the sleeve further including a dampening mechanism located in the operatively upper part of the bore;

a pair of end caps configured to fit over and fasten onto a handlebar to define a pair of opposed flanges in use to capture the sleeve between them; and complementary guide formations respectively on the opposed faces of the flanges of the end caps and the edges of the sleeve to guide the movement of the sleeve along the generally linear path transverse to the handlebar, in use.

2. A shock dampening grip as claimed in claim 1, wherein the dampening mechanism is in the form of a septum spanning across the operatively upper part of the bore to define a chamber above the bore.

3. A shock dampening grip as claimed in claim 1, wherein the endcaps and/or edges of the sleeve are provided with a neutral position return mechanism to locate the sleeve with its dampening mechanism against the handlebar, ready to absorb a shock, in use.

4. A shock dampening grip as claimed in claim 3, wherein the neutral position return mechanism is selected from a spring or repulsing magnets.

5. A shock dampening grip as claimed in claim 1, wherein the complementary guide formations are in the form of pins or ridges orientated along the intended linear transverse movement of the sleeve and formed on the inside face of the endcaps and complementary holes or channels formed proximate the ends of the sleeve for receiving the pins or ridges, respectively, therein to guide the sleeve relative to the end caps, in use.

6. A shock dampening grip as claimed in claim 1, wherein the material for the sleeve is of a rubber material.

7. A shock dampening grip as claimed in claim 6, wherein the rubber material is synthetic resiliently deformable rubber material.

8. The shock dampening grip as claimed in claim 6, wherein the rubber material comprises mouldable or extrudable rubber material.

9. The shock dampening grip as claimed in claim 6, wherein the rubber material comprises silicone.

10. A shock dampening grip as claimed in claim 1, wherein the endcaps are configured to clamp onto the handlebars, in use.

11. The shock dampening grip as claimed in claim 1, wherein the resiliently deformable material comprises thermoplastic polyurethane (TPU).

12. The shock dampening grip as claimed in claim 1, wherein the resiliently deformable material comprises synthetic resiliently deformable elastomer material.

13. The shock dampening grip as claimed in claim 1, wherein the resiliently deformable material comprises mouldable or extrudable elastomer material.

* * * * *